US012289817B1

(12) United States Patent
Xu et al.

(10) Patent No.: US 12,289,817 B1
(45) Date of Patent: Apr. 29, 2025

(54) MICROWAVE HEATING CAVITY

(71) Applicant: The 13th Research Institute of China Electronics Technology Group Corporation, Shijiazhuang (CN)

(72) Inventors: Chunliang Xu, Shijiazhuang (CN); Hongtao Wei, Shijiazhuang (CN); Xiaoliang Li, Shijiazhuang (CN); Tong Li, Shijiazhuang (CN); Junkui Song, Shijiazhuang (CN); Fei Zhang, Shijiazhuang (CN); Daomin Cai, Shijiazhuang (CN)

(73) Assignee: The 13th Research Institute of China Electronics Technology Group Corporation, Shijiazhuang (CN)

( * ) Notice: Subject to any disclaimer, the term of this patent is extended or adjusted under 35 U.S.C. 154(b) by 0 days.

(21) Appl. No.: 19/013,880

(22) Filed: Jan. 8, 2025

Related U.S. Application Data

(63) Continuation of application No. PCT/CN2024/095672, filed on May 28, 2024.

(30) Foreign Application Priority Data

Feb. 22, 2024 (CN) ........................ 202410197908.X

(51) Int. Cl.
*H05B 6/64* (2006.01)
*H05B 6/72* (2006.01)

(52) U.S. Cl.
CPC ......... *H05B 6/6402* (2013.01); *H05B 6/6426* (2013.01); *H05B 6/72* (2013.01)

(58) Field of Classification Search
CPC ....... H05B 6/6402; H05B 6/6426; H05B 6/72
USPC ................ 219/748, 745, 746, 756, 759, 762
See application file for complete search history.

(56) References Cited

U.S. PATENT DOCUMENTS

| | | | | | |
|---|---|---|---|---|---|
| 6,004,505 | A | * | 12/1999 | Roy | C22C 1/051 266/287 |
| 6,127,665 | A | * | 10/2000 | Tatsumu | H05B 6/6411 219/754 |

FOREIGN PATENT DOCUMENTS

| | | | |
|---|---|---|---|
| CN | 205579946 | U | 9/2016 |
| CN | 113729304 | A | 12/2021 |
| CN | 115176521 | A | 10/2022 |

* cited by examiner

*Primary Examiner* — Quang T Van
(74) *Attorney, Agent, or Firm* — AP3 Law Firm PLLC

(57) ABSTRACT

A microwave heating cavity includes a metal shell, a heating sleeve, a dielectric medium, an antenna bracket, a ceramic rod and a metal wire. The metal shell is provided with a middle cavity extending through the metal shell and including a first mounting cavity, a concave air cavity and a second mounting cavity. The heating sleeve is mounted in the first mounting cavity. An accommodating cavity is arranged in the heating sleeve, in which the dielectric medium is arranged. The antenna bracket is mounted in the second mounting cavity. The ceramic rod is mounted on the antenna bracket. The ceramic rod extends into the accommodating cavity and is in contact with the dielectric medium. The metal wire is spirally wound around the ceramic rod and is configured to be connected with an external power.

10 Claims, 10 Drawing Sheets

MICROWAVE HEATING CAVITY

CROSS-REFERENCE TO RELATED APPLICATIONS

This application is a continuation application of International Application No. PCT/CN2024/095672, filed on May 28, 2024 and entitled "microwave heating cavity", which claims priority to Chinese Patent Application No. CN 202410197908.X, filed on Feb. 22, 2024 and entitled "microwave heating cavity". The disclosures of the aforementioned applications are hereby incorporated herein by reference in their entireties.

TECHNICAL FIELD

The present disclosure relates to the technical field of microwave heating, and particularly, to a microwave heating cavity.

BACKGROUND

The frequency bands commonly used in the microwave heating technology in the prior art include L band (890 MHz-940 MHz) and S band (2400 MHz-2500 MHz). Microwave heating technology has been widely used in lots of fields, such as food processing, material drying, ceramic sintering, metal smelting, biological sterilization lamps and microwave medical treatment. Chinese application No. 109764368 A discloses microwave oven technologies. Miniaturized and/or portable heating appliances mainly use heating manner such as resistance wire heating or electromagnetic eddy current, such as disclosed by Chinese application No. 116763017 A.

Microwave oven technologies may use multi-feed input, which has the advantage of using volumetric heating that is energy-saving and environment-friendly, and is with strong penetration; however, also has disadvantage that microwave heating is theoretically affected by the wavelength of microwave, making it difficult to miniaturize to realize portable appliances. Heating manner of resistance wire heating or electromagnetic eddy current heating is surface contact heating, which has problems such as the inability to realize the advantages of microwave heating and the inability to effectively carbonize dielectric medium. Besides, compared with microwave heating, resistance wire heating needs to add a heating sheet or a heating rod in the heating cavity, which is used to pierce the dielectric medium during heating. This is easy to cause the dielectric medium residue after the heating is completed, which is not conducive to the cleaning of the heating cavity. For the electromagnetic eddy current heating, although it is easy to clean the heating cavity because there is no need to add the heating sheet or the heating rod to the heating cavity, it is necessary to add additional materials such as metal sheets to the dielectric medium.

SUMMARY

These and other problems are generally solved or circumvented, and technical advantages are generally achieved, by embodiments of the present disclosure which provides a microwave heating cavity.

Technical Problems

The present disclosure provides a microwave heating cavity to realize miniaturization of heating appliances, increase the utilization rate of energy input, and realize volumetric heating of electromagnetic field within an effective range. The heating manner of the microwave heating cavity provided by the present disclosure is between surface contact heating and volumetric heating, and is balanced between these two heating manners.

Technical Solutions

The present disclosure provides a microwave heating cavity. The microwave heating cavity includes a metal shell. The metal shell is provided with a middle cavity in it. The middle cavity extends through the metal shell along the length direction of the metal shell. The middle cavity includes a first mounting cavity, a concave air cavity and a second mounting cavity that are sequentially formed along the length direction of the metal shell.

A heating sleeve is mounted in the first mounting cavity, with a first end of the heating sleeve extending into the concave air cavity. An accommodating cavity is arranged in the heating sleeve. A dielectric medium is arranged in the accommodating cavity. A first end of the dielectric medium extends out the heating sleeve.

An antenna bracket is mounted in the second mounting cavity. A ceramic rod is mounted at the middle of the antenna bracket. The ceramic rod extends into the accommodating cavity and is in contact with the dielectric medium. The ceramic rod is provided with a metal wire that is spirally wound around the ceramic rod. The metal wire is configured to be connected with an external power.

Advantageous Effects of the Disclosure

The advantageous effects of the microwave heating cavity provided in the present disclosure are as follows. When the metal wire, which is spirally wound around the ceramic rod, is powered, electromagnetic field/microwave is formed, which penetrates the heating sleeve and heats the dielectric medium in the manner of volumetric heating. The concave air cavity is conducive to the propagation of the microwave emitted from the metal wire, therefor, microwave can effectively propagate to the dielectric medium and the efficiency of the volumetric heating is improved. In addition, a part of the microwave energy is directly converted into thermal energy which can be transferred to the dielectric medium through the ceramic rod that is in contact with the dielectric medium, forming a surface contact heating. That is, the dielectric medium is double heated in both volumetric heating and surface contact heating thus the temperature of the dielectric medium can be raised quickly to a desired value.

The heating manner of the microwave heating cavity provided in the present disclosure is between pure surface contact heating and pure volumetric heating, and is balanced between these two heating manners. In addition, the microwave heating cavity provided in the present disclosure can increase the utilization rate of energy input, and can realize the volumetric heating of the electromagnetic field within the effective range, thus the miniaturization of the heating appliances can be realized.

BRIEF DESCRIPTION OF THE DRAWINGS

In order to more clearly illustrate the technical solutions in the embodiments of the present disclosure, the accompanying drawings to be used in the descriptions of the embodiments or the prior art will be briefly described below.

Obviously, the accompanying drawings in the following description are only some embodiments of the present disclosure, and for a person of ordinary skill in the art, without involving any inventive effort, other accompanying drawings may also be obtained according to these accompanying drawings.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

Figure 1:
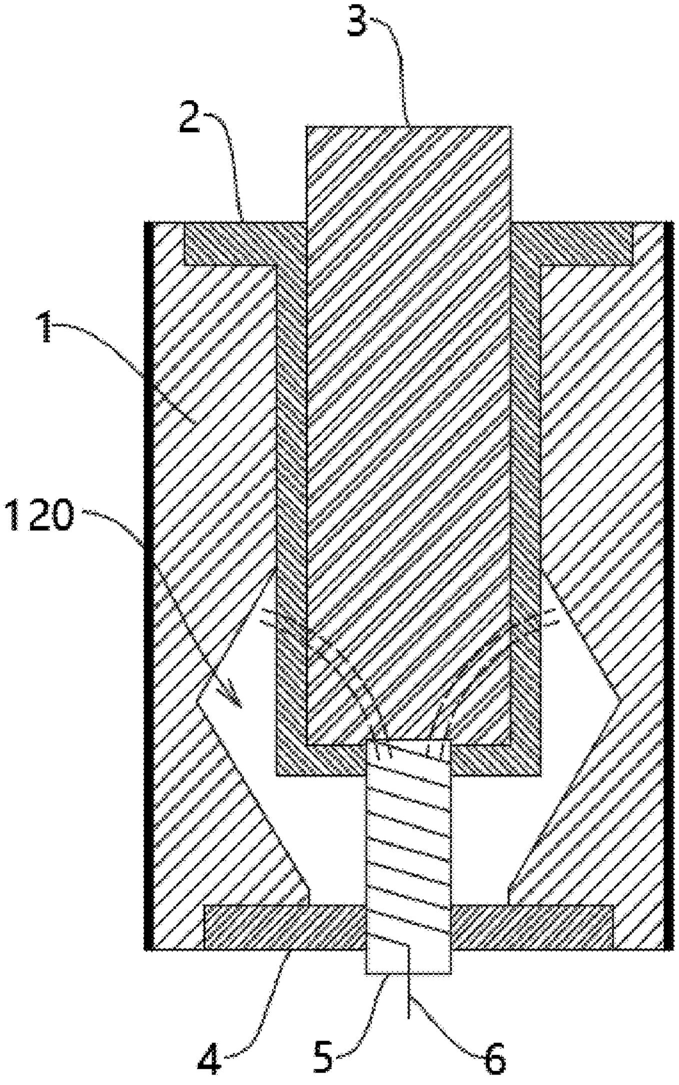
FIG. 1 is a schematic diagram of a structure of a first microwave heating cavity according to embodiments of the present disclosure.

Specific embodiments of the present disclosure are described in detail below with the drawings. The drawings show some preferred embodiments, which are aimed to supplement the text description with graphics, so that people can intuitively and vividly understand any technical feature and the overall technical solution of the present disclosure. The drawings cannot be regarded as limitation of protection scope of the present disclosure.

Please referring to FIGS. 1 to 3 and FIG. 6, in an embodiment, the microwave heating cavity provided in the present disclosure may include a metal shell 1, where a middle cavity 100 is provided in the metal shell 1. The middle cavity 100 extends through the metal shell 1 along the length direction of the metal shell 1. The middle cavity 100 includes a first mounting cavity 110, a concave air cavity 120 and a second mounting cavity 130 that are sequentially formed along the length direction of the metal shell 1 (which is also the length direction of the middle cavity 100). A heating sleeve 2 is mounted in the first mounting cavity 110. An accommodating cavity 210 is arranged in the heating sleeve 2. A dielectric medium 3 is arranged in the accommodating cavity 210. A first end of the dielectric medium 3 (the upper end of the dielectric medium 3 in FIG. 1) extends out of the heating sleeve 2. A first end of the heating sleeve 2 (the lower end of the heating sleeve 2 in FIG. 1) extends into the concave air cavity 120. An antenna bracket 4 is mounted in the second mounting cavity 130. A ceramic rod 5 is mounted at a middle of the antenna bracket 4. The ceramic rod 5 extends into the accommodating cavity 210 and is in contact with the dielectric medium 3. The ceramic rod 5 is provided with a metal wire 6 that is spirally wound around the ceramic rod 5, and the metal wire 6 is configured to be connected with an external power.

Compared with the prior art, the advantageous effects of the microwave heating cavity provided in the present embodiment are as follows. Please referring to FIGS. 1 to 3, the dielectric medium 3 is inserted from top to bottom into the accommodating cavity 210 of the heating sleeve 2. The heating sleeve 2 together with the dielectric medium 3 is inserted from top to bottom into the middle cavity 100 of the metal shell 1, and the heating sleeve 2 is mounted in the first mounting cavity 110, such that the first (lower) end of the heating sleeve 2 is inserted into the concave air cavity 120. The ceramic rod 5, which is spirally wound by the metal wire 6, is mounted (generally vertically) on the antenna bracket 4 that is mounted in the second mounting cavity 130. The ceramic rod 5 extends into the concave air cavity 120, and further extends into the accommodating cavity 210, such that the first (upper) end of the ceramic rod 5 is in full contact with the second (lower) end of the dielectric medium 3. When the metal wire 6 is powered, the metal wire 6, which is spirally wound around the ceramic rod 5, forms electromagnetic field in the concave air cavity 120, and the electromagnetic field heats the dielectric medium 3 in the manner of volumetric heating. At the same time, a part of the microwave energy carried by the electromagnetic field is directly converted into thermal energy to heat the ceramic rod 5 that is in contact with the dielectric medium 3, thus the ceramic rod 5 heats the dielectric medium 3 in the manner of surface contact heating/thermal conduction. The dielectric medium 3 is double heated in the manners of both volumetric heating and surface contact heating, therefore, the temperature of the dielectric medium 3 can be raised quickly to a desired value. The heating manner of the microwave heating cavity provided in the present embodiment is between pure surface contact heating and pure volumetric heating, and is balanced between these two heating manners. In addition, the microwave heating cavity provided in the present embodiment can increase the utilization rate of energy input, and can realize the volumetric heating of the electromagnetic field within the effective range, thus the miniaturization of the heating appliances can be realized.

In the present disclosure, the dielectric medium 3 is the object to be heated. The dielectric medium 3 may be incense, tobacco or substance like that. The dielectric medium 3 has characteristic that the microwave attenuation coefficient is large, and it can absorb microwave energy, produce polarized molecules, and convert microwave energy into heat energy.

Optionally, the metal shell 1 may be made of a material with high conductivity coefficient, such as aluminum, copper or metal material like that. The high conductivity coefficient means a conductivity coefficient greater than a threshold. The metal shell 1 is used to reflect and shield microwave, and it follows skin effect. The metal shell 1 theoretically does not cause microwave energy attenuation, and causes negligible microwave energy attenuation in engineering. After microwave reflected by the metal shell 1 by multiple times, its energy can be effectively converted into heat energy that is absorbed by the dielectric medium 3.

Besides, the metal shell 1 can prevent microwave leakage that may, as harmful radiation, cause damage to human body. Optionally, the outer wall of the metal shell 1 may be provided with an oxide layer 150 that can be used as a microwave boundary. The oxide layer 150 may be prepared by directly oxidizing the outer wall of the metal shell 1.

Optionally, the heating sleeve 2 may be made of a microwave-penetrable material, such as plastic or ceramic. The heating sleeve 2 is designed as a structure with an independent cavity (i.e., accommodating cavity 210). This independent cavity, acting as a heating cavity for accommodating the dielectric medium 3, is easy to clean, even if there is dielectric medium residue on its inner wall. Besides, the dielectric medium 3 is heated by a hybrid heating that is formed by two heating manners of the thermal conduction heating of the ceramic rod 5 and the microwave heating in the concave air cavity 120. The hybrid heating enables the dielectric medium 3 to be heated quickly to a desired temperature, in which the microwave heating is conducive to uniform heating.

Figure 2:
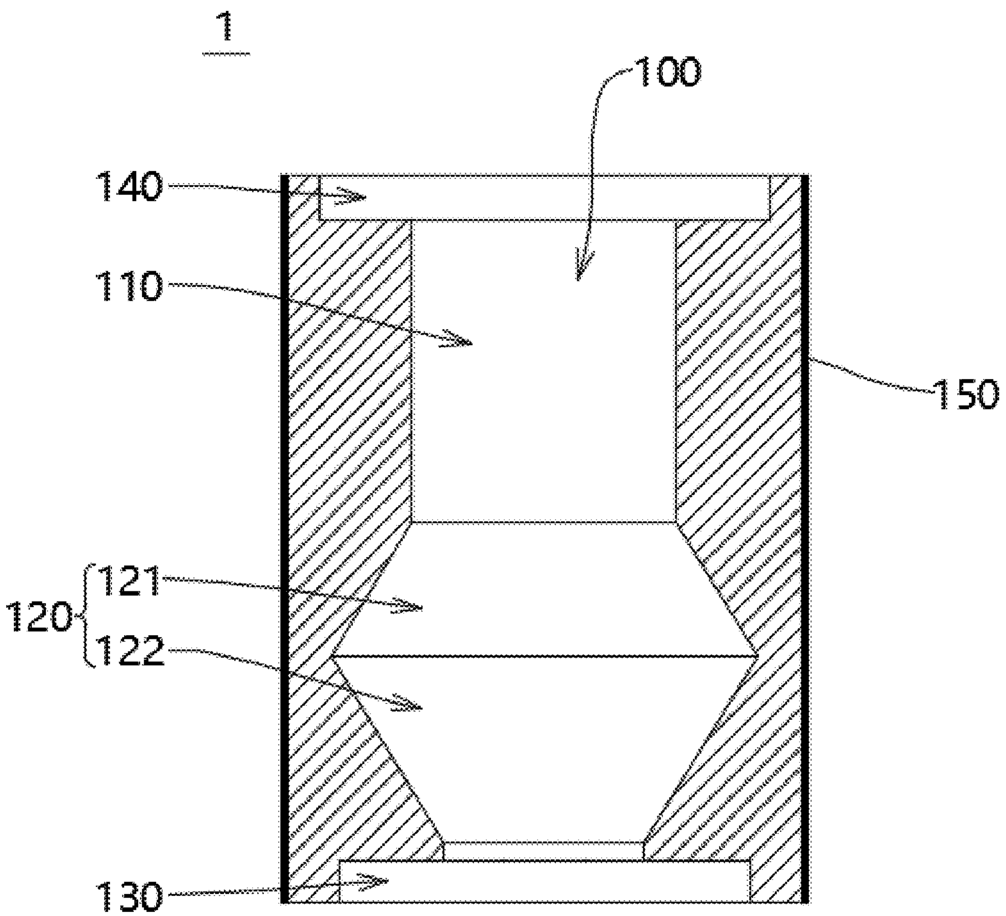
FIG. 2 is a schematic diagram of a structure of a metal shell of the first microwave heating cavity according to embodiments of the present disclosure.
Figure 3:
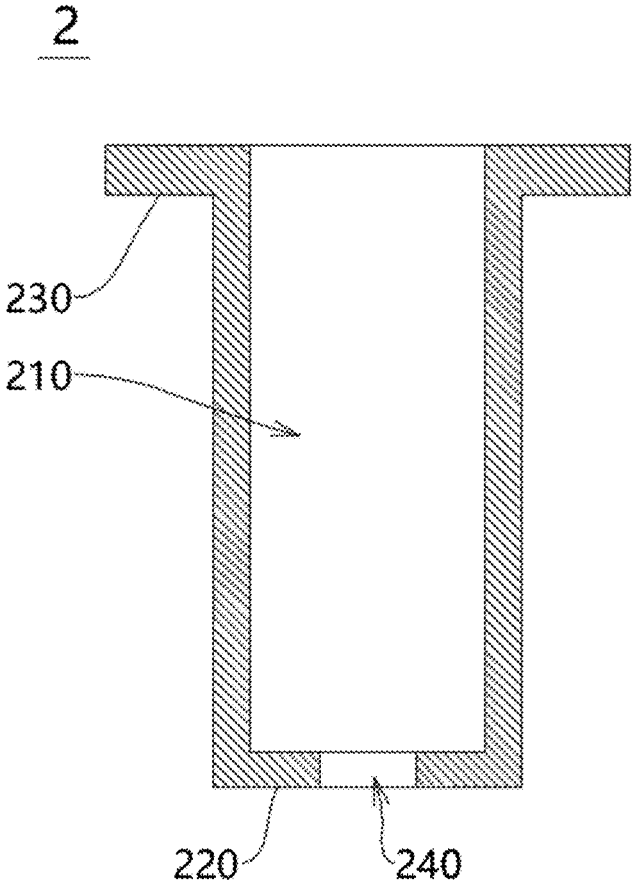
FIG. 3 is a schematic diagram of a structure of a heating sleeve of the first microwave heating cavity according to embodiments of the present disclosure.

In an embodiment, please referring to FIG. 3, the first end of the heating sleeve 2 (the lower end of the heating sleeve 2 in FIG. 3) includes an end plate 220. The middle of the end plate 220 is provided with a through-hole 240 through which the ceramic rod 5 extends into the heating sleeve 2. A second end of the heating sleeve 2 (the upper end of the heating sleeve 2 in FIG. 3) is provided with a flange 230 along the circumferential direction of the second (upper) end of the heating sleeve 2. Please referring to FIG. 2, a first end of the first mounting cavity 110 (the upper end of the first mounting cavity 110 in FIG. 2) is provided with an annular limit groove 140. Please referring to FIG. 1, the flange 230 is arranged in the annular limit groove 140 to limit the depth H (shown in FIG. 7) of insertion of the first (lower) end of the heating sleeve 2 into the concave air cavity 120.

Figure 4:
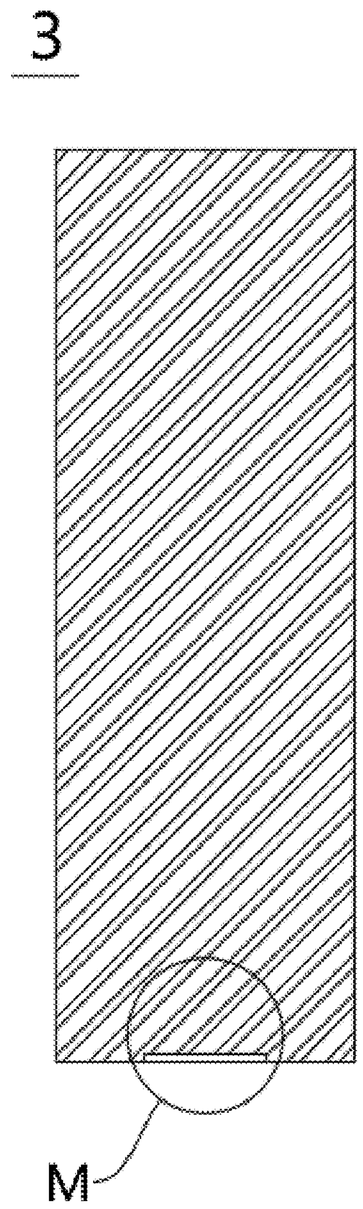
FIG. 4 is a schematic diagram of a structure of a dielectric medium of the first microwave heating cavity according to embodiments of the present disclosure.
Figure 5:
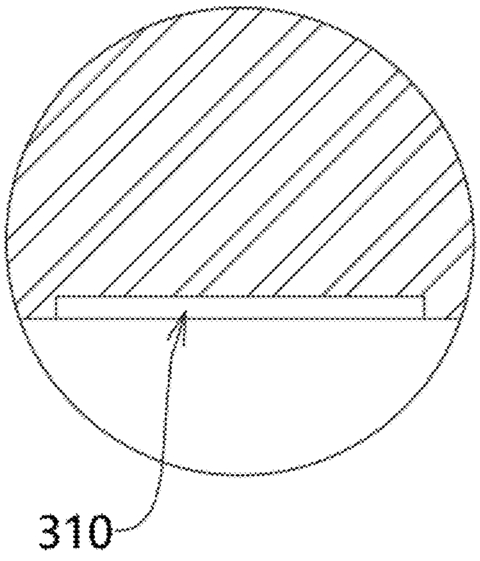
FIG. 5 is an enlarged view of part M in FIG. 4.
Figure 6:
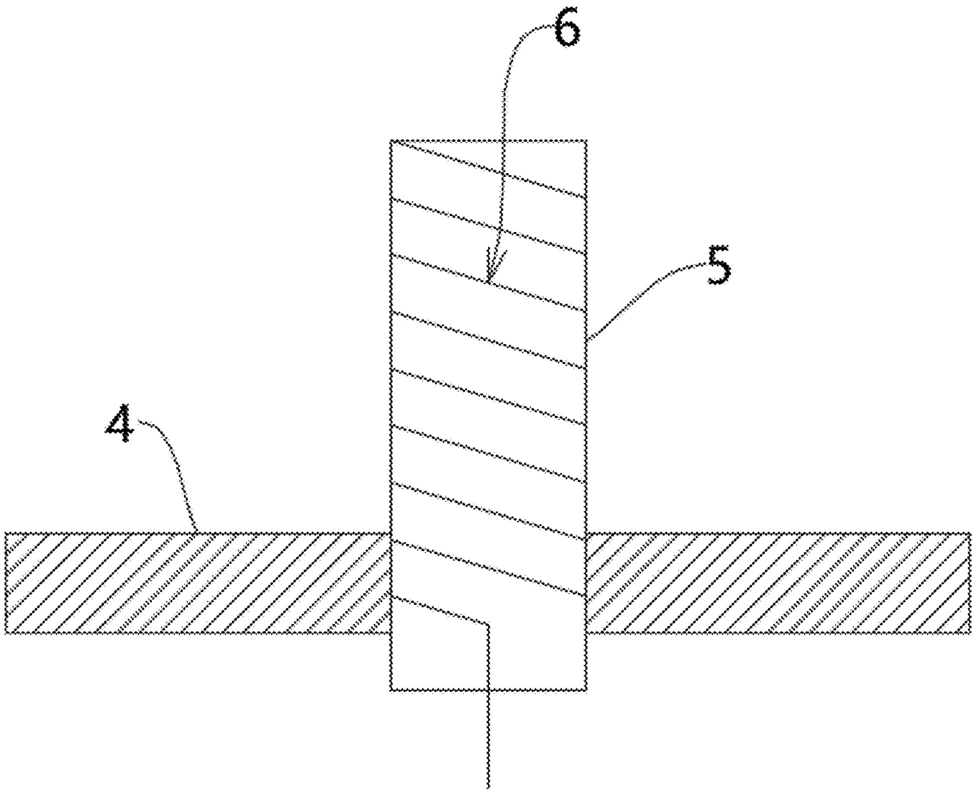
FIG. 6 is a schematic diagram of a structures of an antenna bracket, a ceramic rod and a metal wire of the first microwave heating cavity according to embodiments of the present disclosure.

In an embodiment, please referring to FIGS. 4 and 5, the middle of a second end (the lower end in FIG. 4) of the dielectric medium 3 is provided with a concave 310. Please referring to FIG. 1, the concave 310 is correspondingly arranged with the through-hole 240, such that a first end of the ceramic rod 5 (the upper end of the ceramic rod 5 in FIG. 1) is embedded in the concave 310 when the first (upper) end of the ceramic rod 5 passes through the through-hole 240. When embedded in the concave 310, the outer wall of the first (upper) end of the ceramic rod 5 is in contact with the inner wall of the concave 310, such that the contact area between the ceramic rod 5 and the dielectric medium 3 is increased thus the efficiency of the thermal conduction between the ceramic rod 5 and the dielectric medium 3 is improved.

Figure 7:
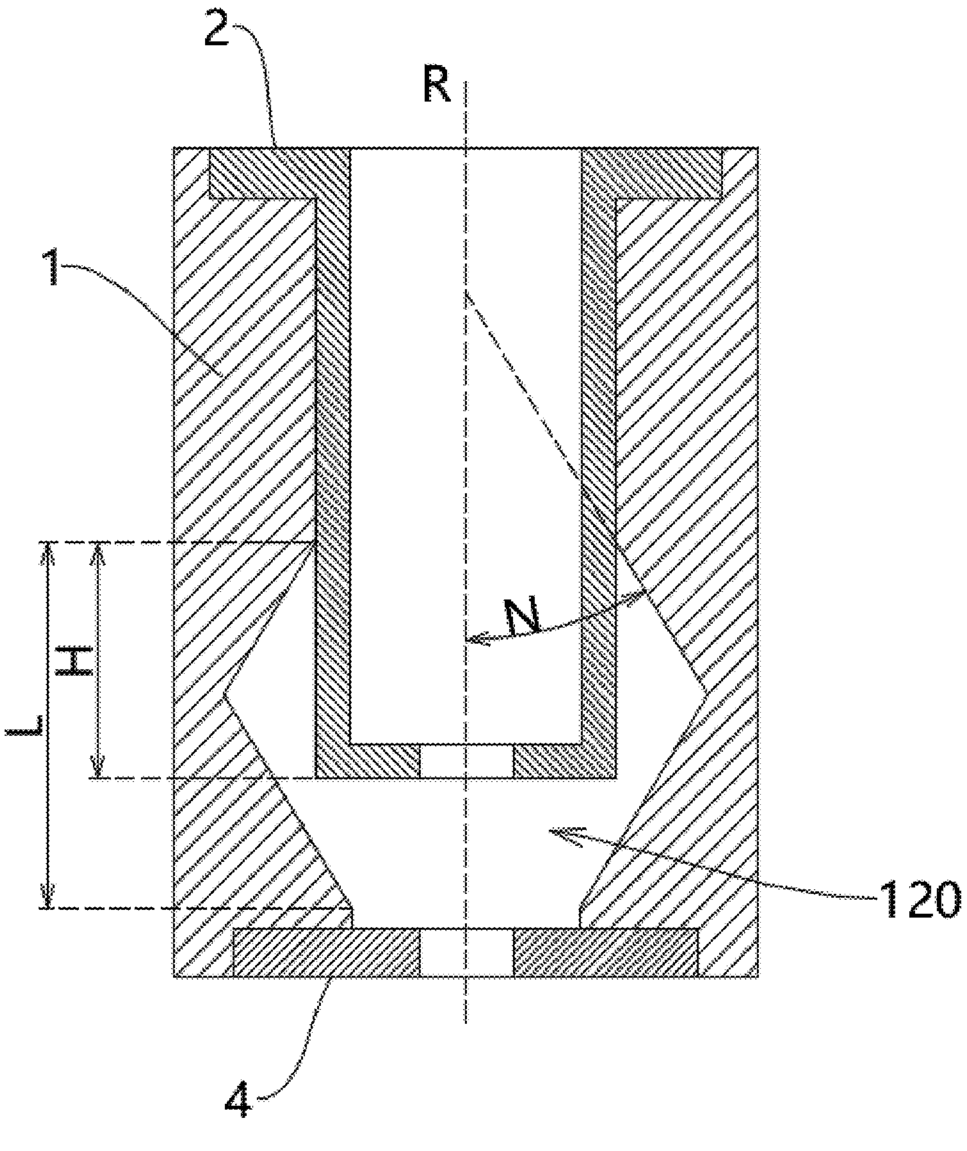
FIG. 7 is a schematic diagram of structures of the metal shell and the heating sleeve of the first microwave heating cavity according to embodiments of the present disclosure.

In an embodiment, please referring to FIG. 7, the depth H of the first (lower) end of the heating sleeve 2 extended into the concave air cavity 120 may be greater than half of the length L of the concave air cavity 120, such that more parts of the heating sleeve 2 as well as more parts of the dielectric medium 3 are inserted into the concave air cavity 120 to be heated by microwave. Thus, the efficiency of the microwave heating is improved and the microwave heating is performed adequately.

In an embodiment, the ceramic rod 5 may be made of aluminum oxide or zirconia, and the ceramic rod 5 has the advantages of good insulation, high stability of molecular structure, no polarization under the action of microwave, and basically not attenuating microwave. In the present disclosure, the ceramic rod 5 can be used to support the metal wire 6 that is attached on the ceramic rod 5 to generate microwave. Optionally, please referring to FIGS. 8 and 9, the outer wall of the ceramic rod 5 may be provided with a spiral groove 501, in which the metal wire 6 is arranged, such that the attachment stability of the metal wire 6 on the ceramic rod 5 is improved.

Optionally, the metal wire 6 may be made of nickel alloy with low resistivity. The diameter of the metal wire 6 may be 0.2 millimeter. The metal wire 6 with a certain length can be wound to form a microwave antenna with S band (2400 MHz-2500 MHz).

Figure 8:
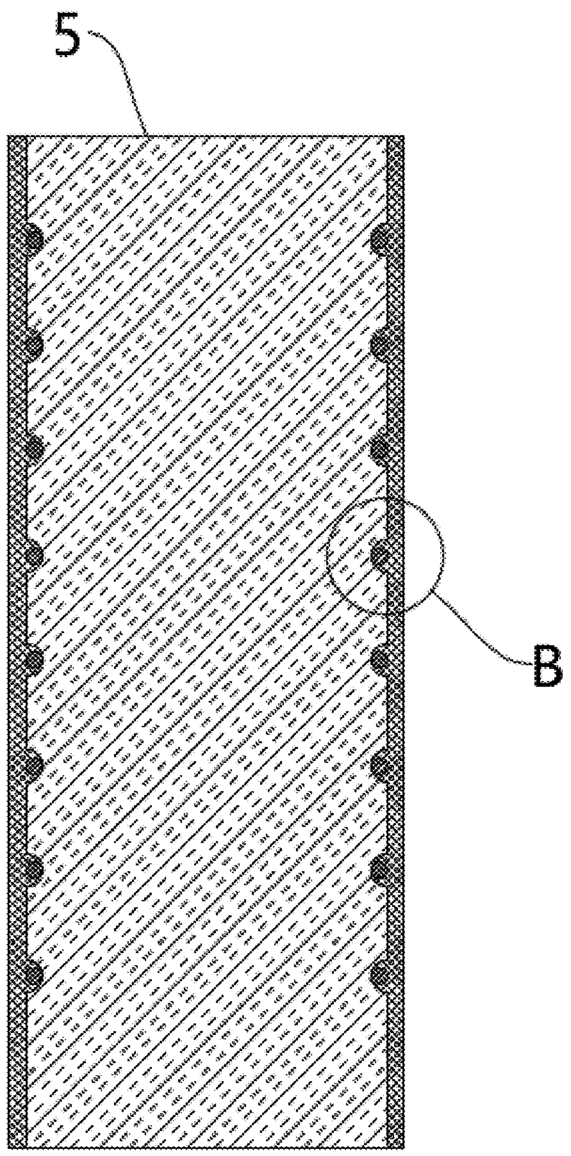
FIG. 8 is a schematic diagram of structures of the ceramic rod and the metal wire of the first microwave heating cavity according to embodiments of the present disclosure.
Figure 9:
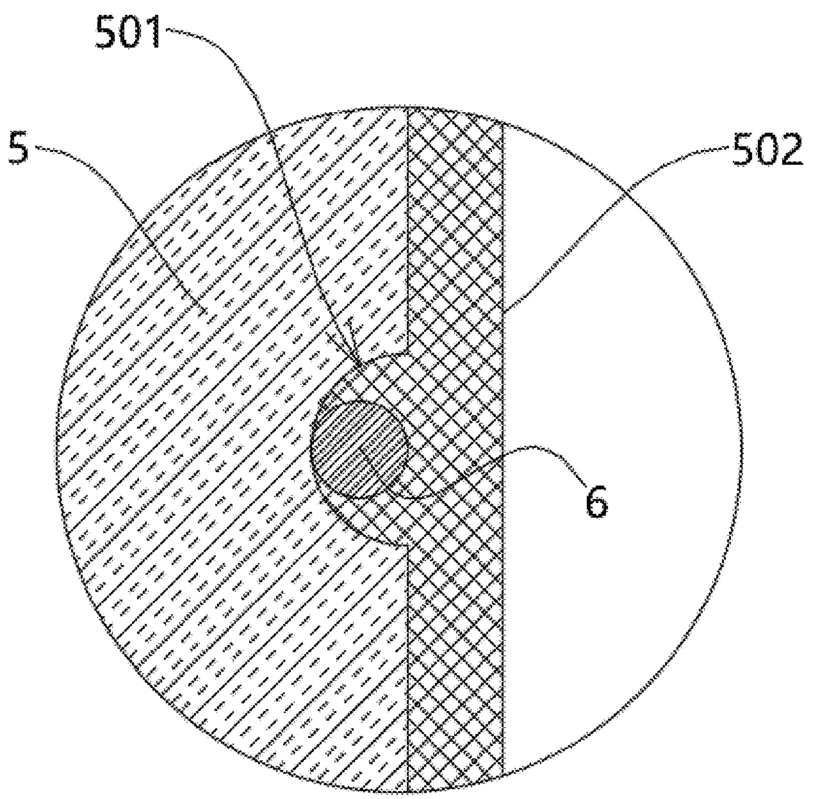
FIG. 9 is an enlarged view of part B in FIG. 8.

Optionally, please referring to FIGS. 8 and 9, the outer wall of the ceramic rod 5 may be provided with an insulation layer 502 covering the metal wire 6, such that the metal wire 6 is protected by the insulation layer 502. The insulation layer 502 may be formed by glass glaze. After the metal wire 6 is wound on the ceramic rod 5, molten glass glaze can be daubed on the outer wall of the ceramic rod 5 to form the insulation layer 502. The insulation layer 502 can not only protect the metal wire 6 and improve the stability of the metal wire 6 but also optimize the smoothness of the surface of the ceramic rod 5. A bandwidth of 160 MHz-180 MHz can be achieved.

In an embodiment, please referring to FIG. 2, the concave air cavity 120 may include a first (upper) conical cavity 121 and a second (lower) conical cavity 122 arranged in a direction from the first mounting cavity 110 to the second mounting cavity 130, where the diameter of the first (upper) conical cavity 121 increases in the direction from the first mounting cavity 110 to the second mounting cavity 130 and the diameter of the second (lower) conical cavity 122 decreases in the direction from the first mounting cavity 110 to the second mounting cavity 130. The first (lower) end of the heating sleeve 2 extends into the second (lower) conical cavity 122. The metal wire 6, which is spirally wound around the ceramic rod 5, can form alternating electromagnetic field at the first (upper) end of the ceramic rod 5 (the alternating electromagnetic field is shown in FIG. 1 by the dashed lines at the upper end of the ceramic rod 5). The alternating electromagnetic field can penetrate the heating sleeve 2, thus performing microwave heating on the dielectric medium 3 arranged in the heating sleeve 2. The concave air cavity 120 is conducive to the propagation of the microwave emitted from the metal wire 6, therefor, microwave can effectively propagate to the dielectric medium 3, improving the efficiency of microwave heating. Optionally, please referring to FIG. 7, the angle N formed by the side wall of the first (upper) conical cavity 121 and the center axis R of the heating sleeve 2 may be in a range from 20 degrees to 45 degrees. Microwave propagates in the concave air cavity 120, penetrates the dielectric medium 3, and is converted into thermal energy when penetrates the dielectric medium 3.

Figure 10:
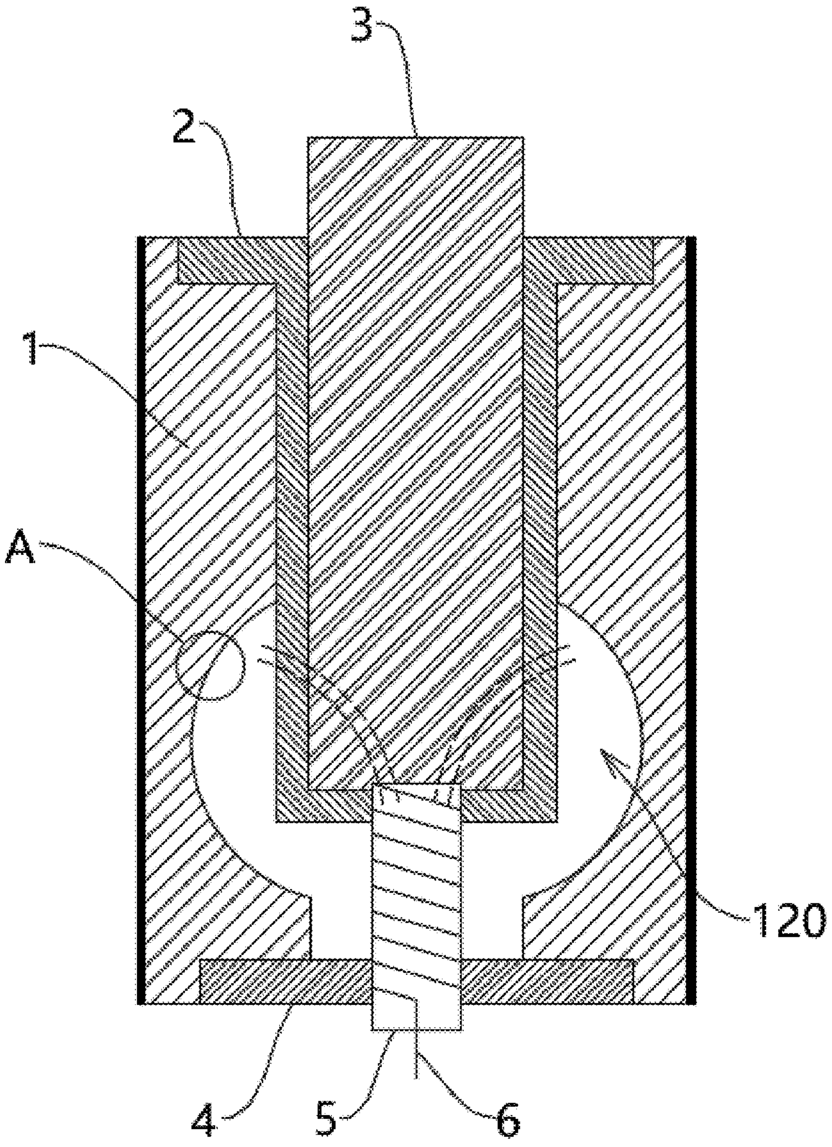
FIG. 10 is a schematic diagram of a structure of a second microwave heating cavity according to embodiments of the present disclosure.
Figure 11:
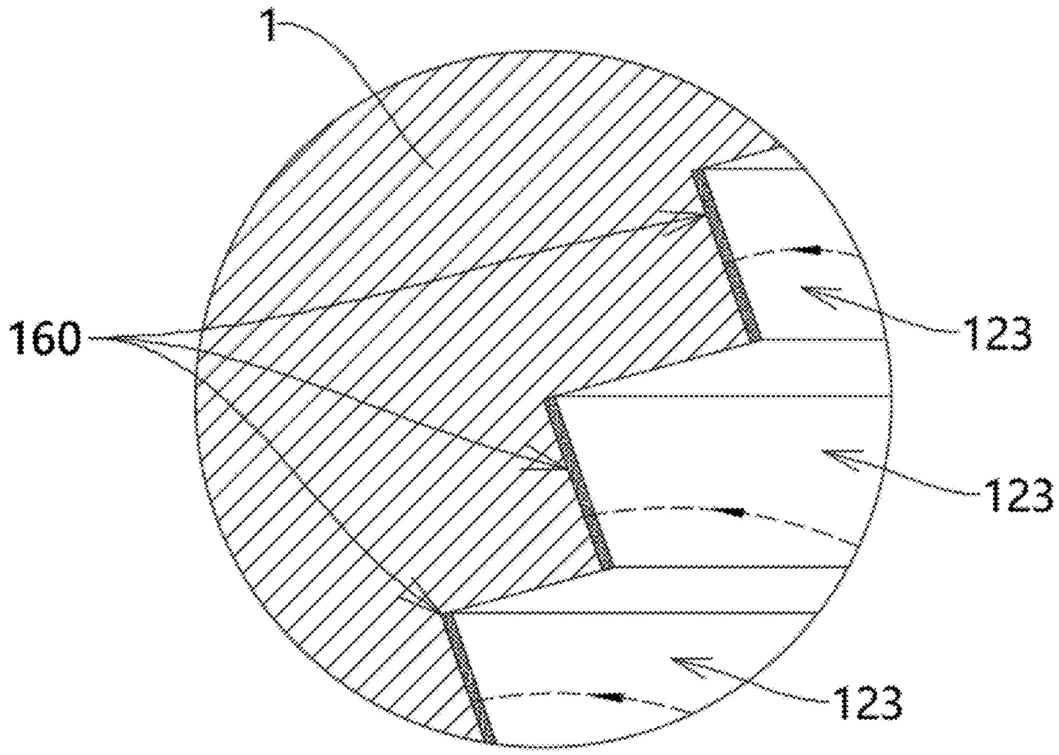
FIG. 11 is an enlarged view of part A in FIG. 10.

In an embodiment, please referring to FIGS. 10 and 11, the concave air cavity 120 may be a spherical cavity, and the first (lower) end of the heating sleeve 2 is below the center of this spherical cavity. The concave air cavity 120 includes multiple conical cavities 123 distributed at equal intervals along the length direction of the metal shell 1. The diameter of each conical cavity 123 gradually decreases in the direction from the first mounting cavity 110 to the second mounting cavity 130, and an inclined conical inner wall along the circumferential direction of the concave air cavity 120 is formed. A heat generating layer 160 may be formed on the inclined conical inner wall, where the heat generating layer 160 may be made of a mixture of high-purity iron powder, gravel particles and catalyst. The catalyst may be a mixture of activated carbon and inorganic salts. Magnetic inductance lines (which is shown in FIG. 11 by the dashed lines with solid arrow) formed at the first (upper) end of the ceramic rod 5 penetrates the heating sleeve 2 and acts on the heat generating layer 160. The trajectories of the magnetic inductance lines can be changed by changing the current in the metal wire 6, so that, under the effect of the magnetic inductance lines, the high-purity iron powder in the heating layer 160 can move, resulting in that the high-purity iron powder rubs against the gravel particles. In addition, under the action of the catalyst, the high-purity iron powder oxidizes with the air in the concave air cavity 120, generating heat to further heat the dielectric medium 3 in the heating sleeve 2, which, together with the contacting heating and electromagnetic field heating, forms a triple heating manner.

The above descriptions are only preferred embodiments of the present disclosure, and are not intended to limit the present disclosure. Any modifications, equivalent replacements and improvements made within the spirit and principle of the present disclosure shall be included within the protection scope of the present disclosure.

The invention claimed is:

1. A microwave heating cavity comprising:

a metal shell, wherein a middle cavity is provided in the metal shell, the middle cavity extends through the metal shell along a length direction of the metal shell, and the middle cavity comprises a first mounting cavity, a concave air cavity and a second mounting cavity that are sequentially formed along the length direction of the metal shell;

a heating sleeve mounted in the first mounting cavity, with a first end of the heating sleeve extending into the concave air cavity, wherein an accommodating cavity is arranged in the heating sleeve;

a dielectric medium arranged in the accommodating cavity, wherein a first end of the dielectric medium extends out of the heating sleeve;

an antenna bracket mounted in the second mounting cavity;

a ceramic rod mounted at a middle of the antenna bracket, wherein the ceramic rod extends into the accommodating cavity and is in contact with the dielectric medium; and a metal wire spirally wound around the ceramic rod, wherein the metal wire is configured to be connected with an external power.

2. The microwave heating cavity of claim 1, wherein the metal shell is made of a material with a conductivity coefficient greater than a threshold, and an outer wall of the metal shell is provided with an oxide layer.

3. The microwave heating cavity of claim 1, wherein the heating sleeve is made of a microwave-penetrable material.

4. The microwave heating cavity of claim 3, wherein, the first end of the heating sleeve comprises an end plate, a middle of the end plate is provided with a through-hole through which the ceramic rod extends into the heating sleeve, and a second end of the heating sleeve comprises a flange along a circumferential direction of the second end of the heating sleeve, a first end of the first mounting cavity is provided with an annular limit groove in which the flange is arranged to limit a depth of insertion of the first end of the heating sleeve into the concave air cavity.

5. The microwave heating cavity of claim 4, wherein a middle of a second end of the dielectric medium is provided with a concave, and the concave is correspondingly arranged with the through-hole, such that a first end of the ceramic rod is embedded in the concave when the first end of the ceramic rod passes through the through-hole.

6. The microwave heating cavity of claim 4, wherein a depth of the first end of the heating sleeve extended into the concave air cavity is greater than half of a length of the concave air cavity.

7. The microwave heating cavity of claim 1, wherein the ceramic rod is made of aluminum oxide or zirconia, an outer wall of the ceramic rod is provided with a spiral groove, and the metal wire is arranged in the spiral groove.

8. The microwave heating cavity of claim 7, wherein the outer wall of the ceramic rod is provided with an insulation layer covering the metal wire.

9. The microwave heating cavity of claim 1, wherein the concave air cavity comprises a first conical cavity and a second conical cavity arranged in a direction from the first mounting cavity to the second mounting cavity, wherein a diameter of the first conical cavity increases in the direction, a diameter of the second conical cavity decreases in the direction, and the first end of the heating sleeve extends into the second conical cavity.

10. The microwave heating cavity of claim 9, wherein an angle formed by a side wall of the first conical cavity and a center axis of the heating sleeve along the length direction of the metal shell is in a range from 20 degrees to 45 degrees.

* * * * *